United States Patent
Hang et al.

(10) Patent No.: US 9,025,834 B2
(45) Date of Patent: May 5, 2015

(54) INPUT VALIDATION, USER AND DATA AUTHENTICATION ON POTENTIALLY COMPROMISED MOBILE DEVICES

(71) Applicants: Isabelle Hang, Karlsruhe (DE); Florian Kerschbaum, Karlsruhe (DE)

(72) Inventors: Isabelle Hang, Karlsruhe (DE); Florian Kerschbaum, Karlsruhe (DE)

(73) Assignee: SAP SE, Walldorf (DE)

( * ) Notice: Subject to any disclaimer, the term of this patent is extended or adjusted under 35 U.S.C. 154(b) by 77 days.

(21) Appl. No.: 13/904,222

(22) Filed: May 29, 2013

(65) Prior Publication Data

US 2014/0359730 A1 Dec. 4, 2014

(51) Int. Cl.
 *G06F 21/36* (2013.01)
 *G06F 21/16* (2013.01)
 *H04L 29/06* (2006.01)

(52) U.S. Cl.
 CPC .............. *G06F 21/36* (2013.01); *G06F 21/16* (2013.01); *H04L 63/08* (2013.01)

(58) Field of Classification Search
 CPC .......... G06F 21/36; G06F 21/16; H04N 63/08
 USPC ........................................................ 382/115
 See application file for complete search history.

(56) References Cited

U.S. PATENT DOCUMENTS

| | | | |
|---|---|---|---|
| 7,174,462 B2 * | 2/2007 | Pering et al. | 713/182 |
| 8,850,519 B2 * | 9/2014 | Osborn et al. | 726/2 |
| 2010/0095371 A1 * | 4/2010 | Rubin | 726/18 |
| 2010/0115607 A1 * | 5/2010 | Pratt et al. | 726/18 |
| 2013/0036459 A1 * | 2/2013 | Liberman et al. | 726/6 |
| 2013/0138968 A1 * | 5/2013 | Yudkin et al. | 713/183 |

OTHER PUBLICATIONS

Hideki Koike, et al., "Awase-E: Photo-based User Authentication System," Information Technology Research Institute, National Institute of Advanced Industrial Science and Technology, retrieved on internet May 28, 2013 at http://www.netaro.info/~zetaka/publications/papers/awasee-UBICOMP2005.pdf , 2 pages.

TakumiYamamoto, et al., "A Proposal of Four-panel cartoon CAPTCHA: The Concept," In Proceedings of the 2010 13th International Conference on Network-Based Information Systems, 2010, pp. 575-578.

Shardul Vikram, "SEMAGE: A New Image-based Two-Factor CAPTCHA," In Proceedings of the 27th Annual Computer Security Applications Conference, ACM Dec. 5-9, 2011, 10 pages.

(Continued)

*Primary Examiner* — Gregory M Desire
(74) *Attorney, Agent, or Firm* — Fish & Richardson P.C.

(57) ABSTRACT

Methods, systems, and computer-readable storage media for authenticating a user and user input to a back-end system and for validating the user input. In some implementations, actions include receiving a unique user identifier and user input, generating a personalized image recognition challenge based on the unique user identifier and the user input, the personalized image recognition challenge including a plurality of images and a written message, the written message instructing a user to select a particular image of the plurality of images to validate the user input, transmitting the personalized image recognition challenge for display on a device, receiving a response to the personalized image recognition challenge, the response comprising a selection of an image from the plurality of images, and authenticating the user and the user input based on the response.

15 Claims, 4 Drawing Sheets

(56) References Cited

OTHER PUBLICATIONS

Jonathan M. McCune, et al., "Bump in the Ether: Mobile Phones as Proxies for Sensitive Input," CMU-Cylab-05-007, Dec. 8, 2005, 24 pages.
Jeremy Elson, et al., "Asirra: A CAPTCHA that Exploits Interest-Aligned Manual Image Categorization," CCS 7 (2007), 9 pages.
Baird et al., "ScatterType: a Reading CAPTCHA Resistant to Segmentation Attack," In Proceedings of the 12th IS&T/SPIE Document Recognition & Retrieval Conference, Jan. 2005, 11 pages.
Chew et al., "BaffleText: A Human Interactive Proof," In Proceedings of the 10th SPIE/IS&T Document Recognition & Retrieval Conference, Jan. 2003, 11 pages.
'Confidenttechnologies.com' [online]. Web, Mobile & Multifactor Authentication, retrieved from the Internet [retrieved no Feb. 25, 2015]: URL < http://www.condenttechnologies.com>, 4 pages.
'Confidenttechnologies.com' [online]. When Passwords Aren't Enough—The Need for Strong Online Authentication That is Easy to Use, retrieved from the Internet [retrieved on Feb. 18, 2015]: URL < http://confidenttechnologies.com/files/FINAL%20white-paper%20When%20Passwords%20Aren't%20Enough.pdf>, 11 pages.
Cox et al., "Digital Watermarking and Steganography," Elsevier Science, 2008, 28 pages.
Douceur, The Sybil Attack, In Revised Papers from the First International Workshop on Peer-to-Peer Systems, IPTPS '01, London, UK, Springer-Verlag, 2002, pp. 251-260.
'Eclipse.com' [online].Java Eclipse. Retrieved from the Internet [retrieve on Feb. 19, 2015]: URL<https://eclipse.org/downloads/>, 7 pages.
'EMC.com' [online]. RSA SecurID Authenticator, retrieved from the Internet [retrieved on Feb. 18, 2015]: URLhttp://www.emc.com/collateral/data-sheet/rsa-secureid-700-authenticator-ds.pdf>, 2 pages.
Fergus et al., "Learning Object Categories from Google's Image Search," In Proceedings of the Tenth IEEE International Conference on Computer Vision, vol. 2, ICCV'05,IEEE Computer Society, pp. 1816-1823.
Golle, "Machine Learning Attacks Against the Asirra CAPTCHA," In Proceedings of the 15th ACM Conference on Computer and Communications Security, CCS '08, New York, NY, 2008, ACM, pp. 535-542.
D. Gollmann, Computer Security, Third Edition, Wiley, 2011, 443 pages.
Huang et al, "Attacking Visible Watermarking Schemes," IEEE Transactions on Multimedia, vol. 6, No. 1, Feb. 2004, 15 pages.
Mccune et al., "Bump in the Ether: A Framework for Securing Sensitive User Input," USENIX Annual Technical Conference, 2006, pp. 185-198.
'Microsoft.com' [online]. Windows 8, retrieved from the Internet [retrieved on Feb. 18, 2015] URL <http://windows.microsoft.com/en-US/windows-8/meet>, 6 pages.
Mohanty, "A DCT Domain Visible Watermarking Technique for Images," IEEE International Conference on Multimedia and Expo, 2000, pp. 1029-1032.
Mori et al., "Recognizing Objects in Adversarial Clutter: Breaking a Visual CAPTCHA," Proceedings of the 2003 IEEE Computer Society Conference on Computer Vision and Pattern Recognition (CVPR'03), IEEE, Jun. 2003, pp. 134-141.
'Android.com' [online]. ADT Plugin, retrieved from the Internet [retrieved on Feb. 18, 2015]: URL <http://developer.android.com/tools/sdk/eclipse-adt.html>, 3 pages.
'Android.com' [online]. Jelly Bean, retrieved from the Internet [retrieved on Feb. 18, 2015]: URL <http://developer.android.com/about/versions/jelly-bean.html>, 8 pages.
Potdar et al., "A Survey of Digital Image Watermarking Techniques," In Proceedings of the 3rd IEEE International Conference on Industrial Informatics (INDIN), 2005, pp. 709-716.
'Samsung.com' [online]. Samsung GALAXY S II, Specification, retrieved from the Internet [retrieved on Feb. 18, 2015]: URL <http://www.samsung.com/global/microsite/galaxys2/html/specification.html>, 1 page.
Sinofsky, "Signing in with a picture password," retrieved from the Internet [retrieved on Feb. 18, 2015]: URL <http://blogs.msdn.com/b/b8/archive/2011/12/16/signing-in-with-a-picture-password.aspx>, Dec. 16 2011, 24 pages.
'Sony.com' [online]. Sony CSL, SONY Computer Science Laboratories, retrieved from the Internet [retrieved on Feb. 18, 2015]: URL <http://www.sonycsl.co.jp/en/>, 3 pages.
'Squareup.com' [online]. Manually Key in Card Payments without the Square Reader [retrieved on Feb. 25, 2015]: URL <https://squareup.com/help/us/en/article/5176-manually-key-in-card-payments-without-the-square-reader>, 2 pages.
Takada et al., Awase-E: Image-based Authentication for Mobile Phones Using User's Favorite Images, Human-Computer Interaction with Mobile Devices and Services, Lecture Notes in Computer Science, vol. 2795, Springer, 2003, pp. 347-351.

* cited by examiner

INPUT VALIDATION, USER AND DATA AUTHENTICATION ON POTENTIALLY COMPROMISED MOBILE DEVICES

BACKGROUND

Devices are increasingly used to conduct interactions, such as e-commerce interactions, in which a front-end device communicates with a back-end system. For example, a legitimate user can communicate with a trusted back-end system using a device, e.g., a smartphone, a tablet computing device. In some instances, a device can become compromised, such that the device can be controlled by and/or sensitive information can be exposed to a malicious user, e.g., an attacker. Such instances can often occur in the bring-your-own-device and mobile cloud infrastructures. In such infrastructures, the user authenticates to the back-end system using something that the user knows, e.g. credentials a password or personal identification number (PIN). Once the user is authenticated, the user can control an application on the back-end system, and can provide user input to the back-end system using the device.

Authentication of a user that provides input and authentication of the provided input is hard to achieve, if the user (unknowingly) relies on a compromised device. For example, using a compromised device can result in authentication factors, e.g., credentials, and/or input being easily stolen. An attacker controlling a compromised device can use the stolen authentication factors to act as an authenticated party and submit false input to a back-end.

SUMMARY

Implementations of the present disclosure include computer-implemented methods for authenticating a user and user input to a back-end system and for validating the user input. In some implementations, actions include receiving a unique user identifier and user input, generating a personalized image recognition challenge based on the unique user identifier and the user input, the personalized image recognition challenge including a plurality of images and a written message, the written message instructing a user to select a particular image of the plurality of images to validate the user input, transmitting the personalized image recognition challenge for display on a device, receiving a response to the personalized image recognition challenge, the response comprising a selection of an image from the plurality of images, and authenticating the user and the user input based on the response.

In some implementations, generating the personalized image recognition challenge includes: querying a database based on the unique user identifier to identify a plurality of personalized images associated with the unique user identifier, each personalized image being associated with a catchword, and selecting one or more personalized images from the plurality of personalized images, the one or more personalized images being included in the personalized image recognition challenge.

In some implementations, respective catchwords associated with the one or more personalized images are included in the written message.

In some implementations, the one or more personalized images are randomly selected, and respective catchwords of the one or more personalized images are different from one another.

In some implementations, generating the personalized image recognition challenge includes: querying a database based on one or more catchwords and the unique user identifier to identify a plurality of non-personalized images, each non-personalized image being associated with a respective catchword of the one or more catchwords and not being associated with the unique user identifier, and selecting one or more non-personalized images from the plurality of non-personalized images, the one or more non-personalized images being included in the personalized image recognition challenge.

In some implementations, the one or more catchwords comprise respective catchwords associated with one or more personalized images, the one or more personalized images being included in the personalized image recognition challenge.

In some implementations, generating the personalized image recognition challenge includes generating a fake input, the fake input being included in the personalized image recognition challenge.

In some implementations, the fake input is not equal to the user input.

In some implementations, generating the personalized image recognition challenge includes: generating a watermark based on the user input, and watermarking images of the plurality of images based on the watermark, such that the watermark is human perceptible in the plurality of images.

In some implementations, the watermark includes the user input, a fake input and a timestamp.

In some implementations, text within the watermark is provided as distorted and/or segmented text.

In some implementations, text within the written message is provided as distorted and/or segmented text.

In some implementations, authenticating the user and the user input based on the response includes determining that the user has correctly selected a personalized image that has been associated with the user input.

In some implementations, the written message further instructs the user to select another particular image of the plurality of images to select fake input.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
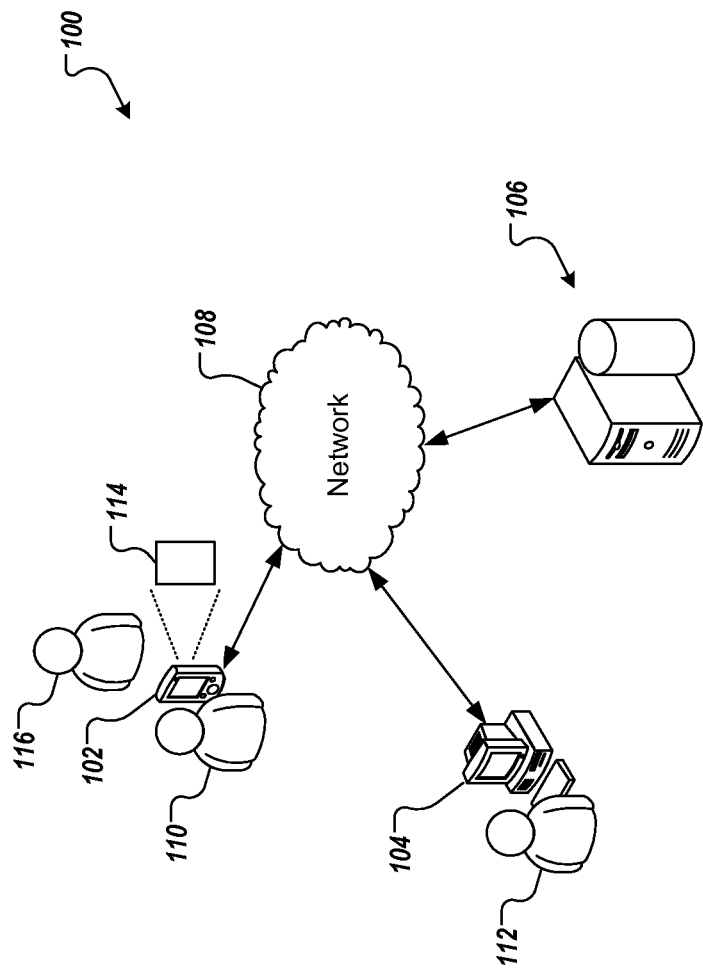
FIG. 1 depicts an example high-level architecture in accordance with implementations of the present disclosure.

Implementations of the present disclosure are generally directed to a protocol to prevent attacks through a compromised device. More particularly, the protocol of the present disclosure inhibits attacks by authenticating a user and user input to a back-end system, and validating the user input. User and user input authentication provides guarantees to the back-end system. For example, authentication of the user assures the back-end system that it is interacting with a particular user, and authentication of the user input guarantees the integrity of the user input provided by the particular user to the back-end system. In this manner, for example, modification of the user input by an attacker is addressed.

In accordance with implementations of the present disclosure, the protocol uses a personalized image recognition challenge generated by the back-end system and provided in a message to the device. The challenge incorporates user authentication, data authentication, and input validation. On a compromised device, the challenge is hard to manipulate or solve for an attacker. In some examples, the personalized image recognition challenge asks the user to confirm the user input by identifying a personalized image and a catchword that the user had previously selected to describe the personalized image.

To solve the challenge, the user has to recognize a plurality of relations. In some examples, a first relation is between the user input and the catchword of the personalized image embedded in the message. In some examples, as discussed in further detail herein, the message can include portions that are distorted and/or segmented. The user has to read the message and relate the user input that the user had provided to the catchword. In some examples, there are one or several catchwords and potential user inputs, where the user is required to choose their own input and the related catchword. Accordingly, the first relation provides input validation. In some examples, a second relation is between the catchword and the personalized image, e.g., relating the message and images provided in the message. The user has to identify the personalized image, which relates to the particular catchword identified in the first relation. In some examples, a plurality of images is provided, where images are associated with the same catchword. In this manner, the second relation provides user authentication. In some examples, a third relation is between images provided in the message and user input. In some examples, the user input is embedded in the images as a watermark. In this manner, the third relation establishes data authentication of the input. In some implementations, words, e.g., catchwords and/or user input, can be distorted and/or segmented in the message. In this manner, automatic reading, e.g., machine-reading, of the words is inhibited. In some examples, one or more words within the message can be provided using Completely Automated Public Turing Test To Tell Computer and Humans Apart (Captcha) techniques.

In some implementations, and as discussed in further detail herein, the personalized image recognition challenge further includes visibly watermarking the images provided in the message. In some examples, the images are watermarked to embed the user input within the images. In some examples, watermarks are provided as markers in the source files of the images, are visible to a human user, and are hard to manipulate. In some examples, and as discussed in further detail herein, the watermarks include user input and fake input.

Implementations of the present disclosure are discussed in further detail with reference to an example context. Within the example context, it is assumed that a device used to interact with a back-end system has been compromised. Consequently, user authentication based on knowledge, e.g., credentials, can now be foiled, because the device can intercept and relay the knowledge to an attacker. In the example context, even device authentication based on secure hardware can be foiled, because it is triggered by the (compromised) operating system of the device. Furthermore, the attacker can replace any input provided by the user to the back-end system. This can be a problem in itself, even if other authentication factors, e.g., cryptographic tokens, are used. The attacker can simply modify the user input to the back-end application after the user has authenticated.

In view of the example context, an example attack will be described. The example attack includes an attacker manipulating user input on a compromised device, e.g., smartphone, during a mobile payment process. In the example attack, Bob owns a shop and Alice is a customer who wants to buy goods for $40. Bob accepts credit card payments using a payment application on a smartphone. An attacker, Eve has compromised the smartphone and is able to change user input provided to the payment application and to manipulate the user screen displayed on the smartphone. To start the payment process, Bob provides credentials, e.g., email address and password, to log into a back-end system. Eve changes this input to her credentials, e.g., email address and password, so that the payment application is actually logged into her account. This can occur unbeknownst to Bob, because Eve manipulates the user screen to pretend that Bob's account is used.

Continuing with the transaction, Bob inputs transaction details to the payment application. Example transaction details can include the amount to be charged, e.g., $40, a description of the goods purchased, and Alice's credit card information. In the example attack, Eve changes the amount to be charged from $40 to $4000 and manipulates the user screen to show an amount of $40. Alice checks the amount and confirms the payment, e.g., signing using the smartphone. The payment application sends the manipulated amount, the description of goods, the credit card information, and the signature to the back-end system. Because the payment application is logged into Eve's account, the back-end system charges $4000 to Alice's account to be paid to Eve's account.

In this example attack, the attacker tricks the user into validating and confirming manipulated user input on a compromised device. The attacker can manipulate the input of the user arbitrarily, can control the screen to hide the manipulated input, and can send the manipulated input from the device to the back-end system. The user has no control over what happens to the user input on the device, because validation and confirmation do not guarantee that the device sends the input unmodified to the back-end system.

The example attack presented above shows an example of an attacker controlling a device which is used by a human user to communicate with a trusted back-end system. This attacker controls the user's device by malicious programs to log all user input, manipulate the user screen, access all communication channels, and execute arbitrary commands. For example, malicious programs can automatically send messages with information logged or stored on the compromised device to an attacker. Consequently, the attacker can steal authentication credentials based on knowledge factors. These authentication credentials include information that the user knows and has to send to the back-end system to authenticate. If an attacker steals this information, the attacker can act autonomously, impersonating the user. This is an example of identity spoofing. Once the credentials are leaked, usage of the credentials is not limited to the compromised device. For example, the attacker can use a leaked credit card PIN to pay in different online shops using multiple devices. Even if the attacker is not able to steal the authentication credentials and reuse them, the attacker can modify the user input and damage integrity of the user input after the user has authenticated, as depicted in the example attach. This is an example of data tampering.

Attacks, such as the example attack discussed above, can be executed by a human user and/or malicious code, e.g., malware executing on the device. In some examples, malicious code can act autonomously in an automated manner, e.g., as an automated attacker. In some examples, a compromised device enables malicious programs to access all communication channels. Consequently, the automated attacker can rely on a malicious back-end system with computational and storage capacities. For example, the automated attacker can store all previous runs of the protocols. Accessing all communication channels and executing arbitrary commands can also enable a human-assisted attacker, where malicious programs send information to a human attacker who can react based on the information and can send adapted commands. For example, a malicious program can send a Captcha challenge to a human attacker to solve it.

FIG. 1 depicts an example architecture 100 in accordance with implementations of the present disclosure. The example architecture 100 reflects an architecture that could be susceptible to example attack vectors, such as that described above in the example attack, and others described in further detail herein. Implementations of the present disclosure, which inhibit such attack vectors, will be described with reference to FIG. 1.

In the depicted example, the architecture 100 includes client devices 102, 104 communicably connected to a back-end system 106 by a network 108. The client device 102 is operated by a user 110, and the client device is operated by a malicious user 112. In some implementations, the client devices 102, 104 can be computing devices such as laptop computers, desktop computers, smartphones, personal digital assistants, portable media players, tablet computers, or other appropriate computing devices that can be used to communicate with the back-end system 106. In some implementations, the back-end system 106 can include one or more computing devices such as a computer server. In some implementations, the back-end system 106 can represent more than one computing device working together to perform the actions of a server computer (e.g., cloud computing). In some implementations, the network 108 can be a public communication network (e.g., the Internet, cellular data network, dialup modems over a telephone network) or a private communications network (e.g., private LAN, leased lines).

In some examples, users of the client devices 102, 104 access the back-end system 106 to use an application hosted thereon, e.g., a payment application. For example, the client devices 102, 104 can execute web browser applications that can be used to access the application. In another example, the client devices 102, 104 can execute software applications that are specific to the application, e.g., a payment authorization "app" running on a smartphone. For example, a user 116 can use the device to authorize a credit card charge, as discussed herein by way of example. In some examples, the client device 104 can execute a special-purpose application that enables the malicious user 112 to launch attacks, such as the example attacks discussed herein.

In some implementations, the client device 102 can execute malicious code 114. For example, at some point, the malicious code 114 can be loaded to the client device 102, unbeknownst to the user 110, and can be executed to enable the malicious user 112 to launch attacks, such as the example attacks discussed herein.

As introduced above, implementations of the present disclosure provide an authentication protocol based on a personalized image recognition challenge. In some implementations, the challenge is generated by the back-end system and is solved by the user. Solving this challenge authenticates the user and the user input to the back-end system. Furthermore, solving the challenge also forces the user to intentionally validate the user input intentionally.

In some implementations, to generate a personalized image recognition challenge, the back-end system requires all users to have a unique user identifier (user-id). In some examples, the user can establish the unique user-id with the back-end system during an initial registration process over a secure channel. In some examples, the users selects one or more personalized images, such as images that have been generated by the user themselves, e.g., pictures the user has taken. Each image is tagged with a catchword selected by the user. In some examples, for each image, the user selects a catchword out of a list of recommended catchwords, e.g., a catchword that the user thinks describes the respective image. In some examples, the back-end system provides and maintains the list of recommended catchwords, and it is expected that same catchwords can used by different users to tag different pictures. The user uploads the images and respective catchwords to the back-end system, which associates the selected images and respective catchwords with the unique user-id, e.g., in a database securely maintained by the back-end system. In some examples, a database scheme can be provided and can include: user-id, picture, catchword.

The back-end system, as well as users, keep the images and the related catch-words secret. In some examples, a compromised device could leak images and related catchwords to an attacker. Consequently, this information is not stored on the device. In other words, during the registration process, the user and the back-end do not communicate using a compromised device, and instead communicate on a channel that is known to be secure.

After the registration process, the user is able to authenticate themselves and their input, and to communicate with the back-end system using a potentially compromised device. Implementations of the protocol will be discussed in further detail with reference to the examples above.

In some examples, the user Alice sends a message with the unique user-id "alice" and input d to the back-end system. Receiving this message, the back-end generates a timestamp t. The back-end system takes the user-id alice and makes multiple database queries based on this information. In some examples, a first query queries all entries associated with the user-id alice. In some examples, the back-end system randomly chooses two entries associated with the user-id alice having different catchwords, e.g., one entry with catchword1 and another entry with catchword2. In some examples, a second query queries all entries in the database with catchword1 and user-id "not alice." That is, all entries that are not associated with the user-id alice. In some examples, the back-end system randomly chooses n entries with pairwise different user-ids. In some examples, a third query queries all entries in the database with catchword2 and user-id not alice.

That is, all entries that are not associated with the user-id alice. Again, the back-end system randomly chooses n entries with pairwise different user-ids. This totals 2n+2 database entries: one database entry with user-id alice and catchword1, one database entry with user-id alice and catchword2, n database entries with pairwise different user-ids not alice and catchword1, and n database entries with pairwise different user-ids not alice and catchword2. These 2n+2 database entries contain 2n+2 image files, n+1 with catchword1 and n+1 with catchword2.

In some implementations, the back-end system takes the user input d, provided by the user, and generates fake input d*, such that d is not equal to d*. The back-end system generates the personalized image based recognition challenge to include the 2n+2 images, the catchwords catchword1 and catchword2, the user input d and the fake input d*. In some implementations, and as discussed in further detail below, the recognition challenge is generated by the back-end system by watermarking the images, associating the catchwords with the user data d and the fake data d*, and generating a written message.

In some examples, the back-end system embeds the user data d, the fake data d*, and time stamp t in the 2n+2 images. More specifically, the back-end system visibly watermarks the images with this information. In some examples, the back-end system uses the image files of the 2n+2 images as host images and uses the user data d, the fake data d*, and the timestamp t as the watermark. In some examples, a watermark technique can be used, where each character of the user data d, the fake data d*, and the timestamp t are provided in thick, non-transparent, and different typefaces on the host images. In this manner, image recovery attacks can be inhibited. The watermarked images visually connect the user input with the personalized image. More specifically, by watermarking with the user input d, the user (upon viewing the watermarked images) is assured that the back-end system has correctly received the user input. In some examples, the watermarks are arranged equally over all of the images (depicted in FIG. 2B). In some examples, the watermarks are arranged over the images in an unstructured manner.

In further detail, the back-end system uses the visible watermark to embed the received user input, the user input d, in an image, the personalized image, which is not available to the attacker. In some examples, a watermark included in an image file is a manipulation of the original source file to embed additional information. In general, watermarks are characterized by their imperceptibility, which means they do not detract from the aesthetics of the host image by the inseparability from the host image and the ability to undergo the same transformations as the host image. If a watermark is intentionally perceptible to a human user, the watermark image is visibly embedded in a host image resulting in a visible watermark, as discussed above.

A visible watermark, however, is prone to removal attacks which attempt to erase the watermark. In some examples, such attacks use image recovery techniques to regain the host image. In accordance with implementations of the present disclosure, the use of thick, non-transparent lines within the watermark complicates such attacks, but limits the imperceptibility of the watermark. It can be assumed that it is possible (but time consuming) to erase a watermark and insert a new watermark in the host image. For example, a human can conduct the image recovery process.

As noted above, the back-end system associates the input data d with catchword1, and associates the fake data d* with catchword2. Consequently, n+1 database entries having catchword1 are associated with the user input d, and n+1 database entries having catchword2 are associated with the fake data d*. Among the n+1 database entries having catchword1, there is only one database entry associated with the unique user-id, e.g., alice, which is associated with the user input d. Among the n+1 database entries with catchword2, there is only one database entry with the unique user-id, e.g., alice, which is associated with the fake data d*, respectively. The identification of a personalized image enables user authentication, because the personalized image is a secret that is shared between the back-end system and the user. Further, because the personalized image is associated with the particular user input d, data authentication is also provided.

As noted above, the back-end system generates a written message for the user. In some examples, the written message asks the user to identify the personalized image tagged with catchword1 to confirm the user input d, or to identify the personalized image tagged with catchword2 to confirm the fake data d*. This choice between two different inputs establishes an intentional input validation for the user. In some implementations, catchword1, catchword2, the user input d, and/or the fake data d* can be depicted as Captchas. This complicates scanning for an automated attacker.

In further detail, a Captcha is a challenge that is relatively easy to solve for a human user, but is hard to solve for a computer program, e.g., an automated attacker. In some examples, Captchas can include image-based Captchas, and reading-based Captchas. In some examples, a reading Captcha is a challenge to read distorted images of text-strings and to provide the recognized letters and digits to a back-end system. This exploits the gap in the ability between human users and machines in reading images of texts.

In some implementations, the written message provided by the back-end system includes text provided as Captcha text. An example Captcha type can include ScatterType Captcha. In some examples, the ScatterType algorithm chooses a text-string, a typeface, and cutting and shattering parameters pseudo-randomly and generates a Captcha. In some examples, each letter of these text-strings is changed to an upper or lower case. For each character (letter or digit), a different typeface can be applied. Further, cutting and scattering can be separately applied to each character with different parameters. In some examples, choices with respect to lower or upper case, typeface and/or cutting and scattering are made pseudo-randomly. It is appreciated that any appropriate Captcha type can be used.

In accordance with implementations of the present disclosure, this algorithm is adapted and is used as a protection measure against automatic reading of the written messages. In some examples, instead of a pseudo-randomly generated text-string, the algorithm is applied to text-strings that are partly known to an attacker. For example, user input d can be assumed to be known to the attacker, because it is sent to the back-end system on the compromised device. Further, the list of possible catchwords can also be available to the attacker. However, the fake input, i.e., the fake data d*, generated by the back-end system is unknown to the attacker.

The back-end system generates the recognition challenge, which includes the 2n+2 watermarked images and the written message. The recognition challenge is sent to the user, who is challenged to relate the user input d with catchword1, and to recognize their personalized image related to catchword1. To solve this challenge, the user reads the written message provided in the challenge and recognizes the differences between the user input d and the fake data d*, and between catchword1 and catchword2. The user can also recognize the relation between the user input d and catchword1, as well as between the fake data d* and catchword2. The user determines whether the watermark of the images shows the user input d and the time stamp t of a current time/date. If yes, the user identifies the personalized image related to catchword1, and returns this information to the back-end system. For example, user input can be provided to the recognition challenge provided on a display of the device. If no, the user knows that the back-end system has not correctly received the user input d, and aborts the transaction. The use of the fake data d* also as a watermark guarantees to the user that the written message is not manipulated.

In some implementations, the time frame between submitting the user input to the back-end system, and returning the solved personalized image recognition challenge is limited. In this manner, the time frame during which an attacker can manipulate the challenge is limited.

The back-end system receives information indicating which watermarked image file was selected by the user. Based on the original image file, the back-end system selects the respective database entry. If the user-id of this entry equals alice, then the user has identified a personalized image that was submitted by the user to the back-end, e.g., during registration. This authenticates the user to the back-end system. If the catchword of the selected image equals catchword1, then the user has identified their picture tagged with the catchword catchword1. This means that the user has related the user input d to catchword1, and thereby validated the user input d and authenticated the user input d. The back-end system ends protocol run with a confirmation sent to the user.

In some implementations, it is assumed that a user is able to identify their personalized image and is able to correctly select the personalized image. Consequently, and in some implementations, a single attempt to solve the image recognition challenge is provided.

Table 1, below, presents example step-by-step details of the protocol in accordance with implementations of the present disclosure, where $p_i$ indicates personalized images, $c_i$ indicates respective catchwords, and $chall_i$ indicates generated recognition challenges. Table 1 assumes that the back-end system and the user have established a user-id that uniquely identifies the user.

TABLE 1

| set-up | 1: | User → Back-End | $p_i$, $c_i$ |
|---|---|---|---|
| protocol | 2: | User | d |
| | 3: | User → Back-End | user-id, d |
| | 4: | Back-End | t |
| | 5: | Back-End | create $chall_i$ = $chall(p_i, c_i, d, d^*, t)$ |
| | 6: | Back-End → User | $chall_i$ |
| | 7: | User → Back-End | $p_i$ |
| optional | 7a: | repeat 5-7 | |
| | 8: | Back-End → User | confirmation |

Step 1 shows the registration (set-up) phase where the user submits personalized images and respective catchwords to the back-end. Steps 2-8 depict an example protocol run.

Referring now to FIGS. 1 and 2A-2C, implementations of the present disclosure are described in further detail with reference to the example attack discussed above. In the example attack, the retailer Bob relies on a device, e.g., a smartphone, and a payment application to accept credit card payments. Because this example is prone to attacks, the example below provides an overview of a protocol in accordance with implementations of the present disclosure, which provides user and data authentication on a potentially compromised device.

Customer Alice and retailer Bob, e.g., a retailer employed at Good Company, have previously registered with the back-end system, which handles details of the payment. During her registration, Alice submits payment information, e.g., credit card details, and personalized images to the back-end system, and tags the images with catchwords, e.g., selected from a list of available catchwords. During his registration, Bob provides bank account information, which can be used to transfer funds to Bob's bank account.

Figure 2:
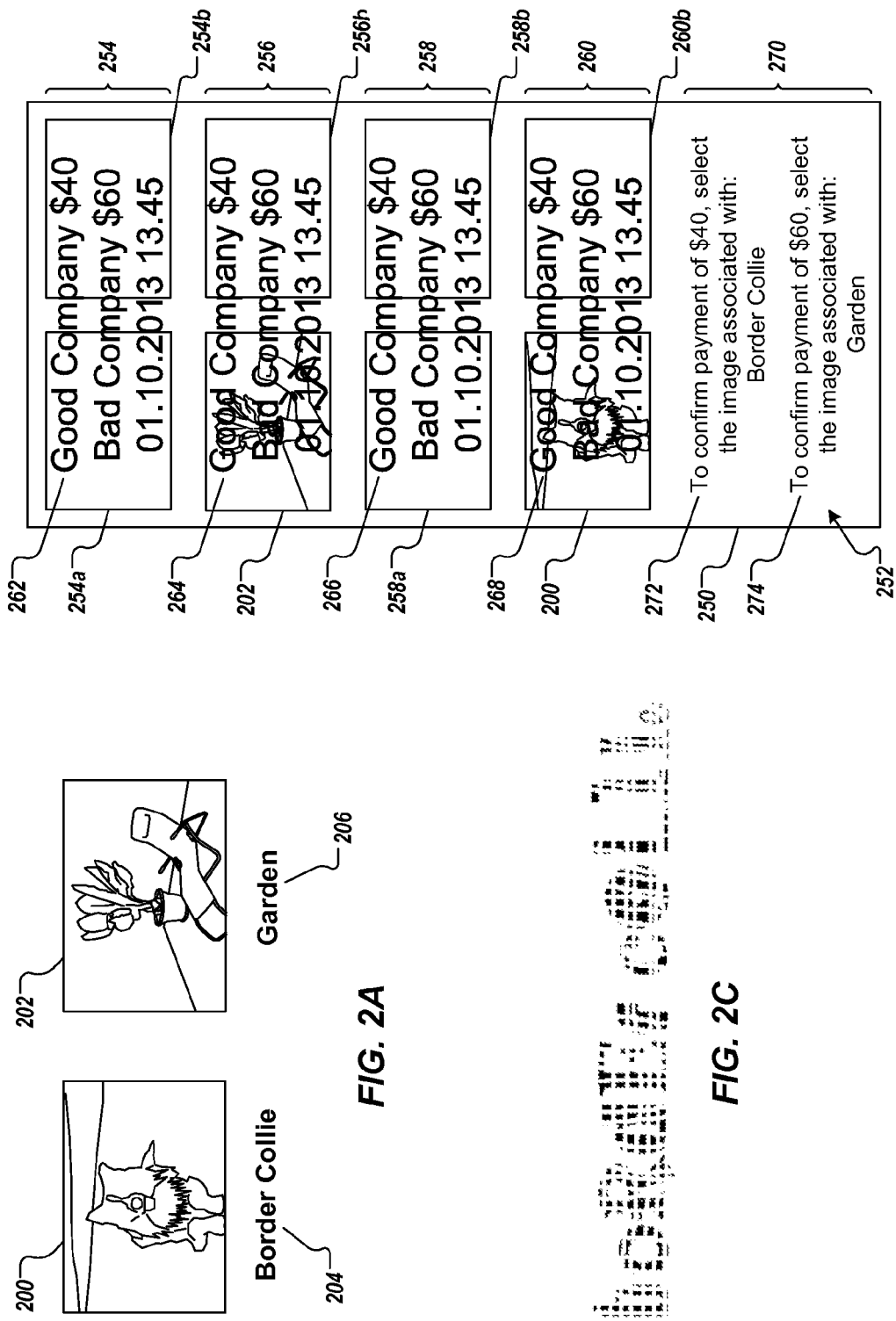
FIGS. 2A-2C depicts an example implementation of the present disclosure.

FIG. 2A depicts example personalized images 200, 202 tagged with example catchwords 204, 206. The image 200 depicts a particular dog, and is tagged with the catchword 204, provided here as "Border Collie." The image 202 depicts plants and a chair, and is tagged with the catchword 206, provided here as "Garden." During the registration process, the user submits their unique user-id, e.g., alice, the images, and the catchwords, e.g., Border Collie and Garden, to the back-end system from a non-compromised device. In some examples, each picture can only be submitted once to the back-end system. The back-end system stores the received information as database entries.

Continuing with the example, the retailer starts the payment process and sends user-id, amount, and acceptor of the payment to the back-end. In this example, the user with user-id alice wants to pay the amount of $40 to the acceptor of the payment, the retailer Good Company. Receiving this information, the back-end system generates the personalized image recognition challenge, as discussed above. In this example, the recognition challenge includes eight images. In some examples, the number of images can be determined based on the device. For example, the number of images can be selected to optimize depiction on an average display size for the particular type of device, e.g., smartphone. For example, a larger number of pictures can be displayed on a tablet computing device than on a smartphone.

Continuing, the back-end system generates a time stamp t, e.g., 01:10:2013 13:45. The back-end system queries all database entries using the user-id alice and chooses a database entry with the catchword Border Collie and a database entry with the catchword Garden. The back-end system queries all database entries with the catchword Border Collie and the user-id not alice, and randomly chooses three images associated with the catchword Border Collie. The back-end system queries all database entries with the catchword Garden and the user-id not alice, and randomly chooses three images associated with the catchword Garden. The back-end system generates fake payment data. In this example, the fake data includes the amount $60 and acceptor Bad Company. The back-end system watermarks the images with received data and fake data, associates the user input $40 and Good Company to the catchword Border Collie, and associates the fake data $60 and Bad Company to the catchword Garden. In this example, the written message asks the user to identify their personalized image tagged with the catchword Border Collie, if the user would like to pay $40 to Good Company, or to identify their personalized image tagged with the catchword Garden, if the user would like to pay $60 to Bad Company. In some examples, the written message includes the user input, Good Company, the fake input, Bad Company, and the catchwords Border Collie and Garden in a Captcha style.

FIG. 2B depicts a user interface 250 including a personalized image recognition challenge 252 in accordance with implementations of the present disclosure. The personalized image recognition challenge 252 is based on the example discussed above, and includes image sets 254, 256, 258, 260 with respective watermarks 262, 264, 266, 268, and a written message 270. The image sets 254, 258 include images 254a, 254b, 258a, 258b, respectively, which were not provided by the user, Alice in this example. The image set 256 includes the image 202 provided by the user, and an image 256b not provided by the user. The image set 260 includes the image 200 provided by the user, and an image 260b not provided by the user. In the depicted example, the images 254a, 254b, 256b, 258a, 258b, 260b are absent of content. The absence of content is intended for purposes of clarity of the discussion and depiction of FIG. 2B. It is appreciated that the images 254a, 254b, 256b, 258a, 258b, 260b would include content, and are provided by users that are not the user Alice. Further, each of the images 254a, 254b, 256b, 258a, 258b, 260b is associated with one of the catchwords Border Collie and Gardner, in this example. Accordingly, the content of each of the images 254a, 254b, 256b, 258a, 258b, 260b can have some relation to the catchwords Border Collie and Garden, as determined by respective users (not Alice) that provided the images 254a, 254b, 256b, 258a, 258b, 260b. In some examples, at least one image in each of the image sets 254, 256, 258, 260 is associated with the catchword Border Collie, and at least one image in each of the image sets 254, 256, 258, 260 is associated with the catchword Garden.

The written message 270 includes a first instruction 272 and a second instruction 274. In the depicted example, the first instruction 272 instructs the user to select the personalized image tagged with the catchword Border Collie to confirm payment of $40 to Good Company, and the second instruction 274 instructs the user to select the personalized image tagged with the catchword Garden to confirm payment of $60 to Bad Company. If the user selects the image 200, the transaction is executed and the user's credit card is charged $40. If the user selects any other image, the transaction is aborted.

In some implementations, the correctly identified image is removed and is unavailable for use in authorizing subsequent transactions. In the example of FIGS. 2A and 2B, the image 200 would no longer be usable by the back-end system, in response to the user having selected the image 200 to be charged $40 to the benefit of Good Company.

Although depicted in a plaintext style, it is appreciated that all or at least portions of the written message 270 and the watermarks 262, 264, 266, 268 can be provided as Captcha-style text. For example, the terms "Border Collie" and "Garden" can be provided in Captcha-style text within the first and second instructions 272, 274, respectively. FIG. 2C depicts an example of Captcha-style text that can be used. It is appreciated that any of the text provided in the challenge, e.g., text within the watermarks, text within the written messages can be provided as Captcha-style text.

In accordance with implementations of the present disclosure, the user can select the appropriate image to confirm payment. In the example of FIG. 2B, the user can select (e.g., click-on, tap-on) the image 200 to confirm payment of $40 to good Company. As discussed above, if the user clicks on any other image, even the image 202, the payment process is aborted.

In some implementations, the probability of guessing the correct personalized image can be provided as:

$$\frac{1}{2n+2}$$

given that an attacker cannot relate the images to their associated catchwords. Accordingly, the difficulty in guessing the correct image depends on the quantity of images displayed in the recognition challenge. For example, if 2n+2 increases, the probability of guessing the correct image decreases, thereby increasing the security level increases.

On devices such as mobile devices, however, the number of images is limited by the screen size. Consider the example personalized image recognition challenge discussed above with reference to FIG. 2B. In that example, the probability of guessing the correct picture is 12.5%. That is, an attacker has a 12.5% chance of guessing the correct image.

In some implementations, multiple personalized image recognition challenges can be executed, e.g., Step 7a in Table 1 above. In some examples, a number of repetitions can offer the same security level as the other mechanism, e.g., PIN-based authentication. In the example discussed above with reference to FIG. 2B, eight images are displayed in the challenge, resulting in the 12.5% probability of guessing the correct image. By using multiple challenges, this probability can be significantly reduced. In some examples, the correct image must be selected in each of the multiple challenges in order to authenticate the user and the user input, and to validate the user input. In some examples, the correct image must be selected a threshold number of times across the multiple challenges in order to authenticate the user and the user input, and to validate the user input.

Figure 3:
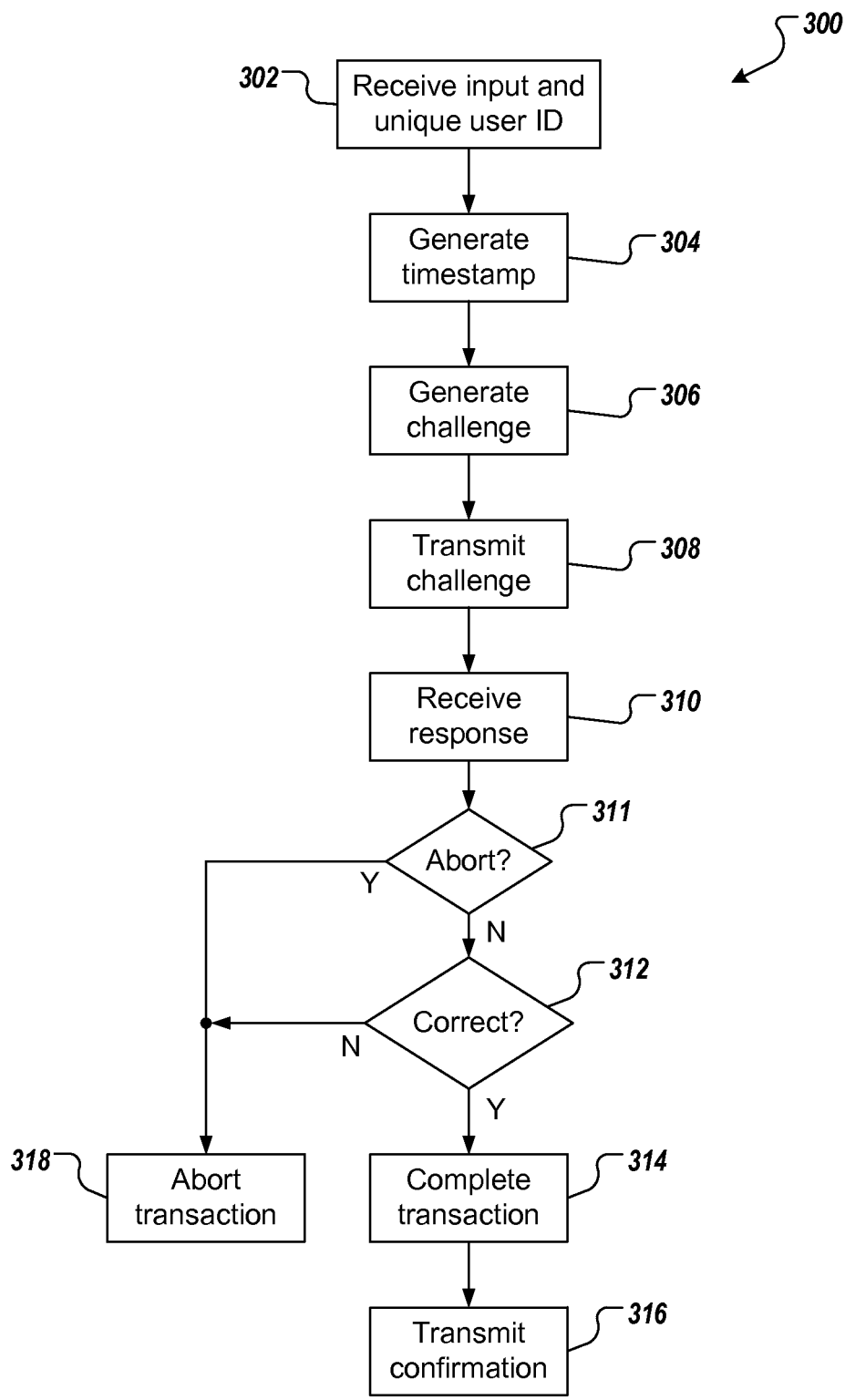
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices. In some examples, the back-end system 108 of FIG. 1 can execute the example process 300.

User input and a unique user identifier is received (302). For example, the back-end system receives user input d and user-id as part of a payment authorization process provided by a payment application executed on the back-end system. A timestamp is generated (304). For example, the back-end system generates a timestamp t in response to receiving the user input d.

A personalized image recognition challenge is generated (306). For example, the back-end system generates the personalized image recognition challenge based on the user input d and the user-id. In some examples, and as discussed herein, the back-end system queries a database to select multiple images associated with the user-id and multiple images not associated with the user-id, and generates a watermark and a written message. The personalized image recognition challenge is transmitted (308). For example, the back-end system transmits the challenge to a device, from which the user input d and user-id were received.

A response is received (310). For example, the back-end system receives a user selection from the personalized image recognition challenge. It is determined whether the response includes a user instruction to abort the transaction (311). For example, instead of selecting an image, the user can opt to abort the transaction. If the response includes a user instruction to abort the transaction, the transaction sought to be approved is aborted (318). If the response does not include a user instruction to abort the transaction, it is determined whether the response includes a correct user selection of an image (312). If the correct image was selected, the transaction sought to be approved is completed (314), and a confirmation is transmitted (316). If the correct image is not selected, the transaction sought to be approved is aborted (318).

Figure 4:
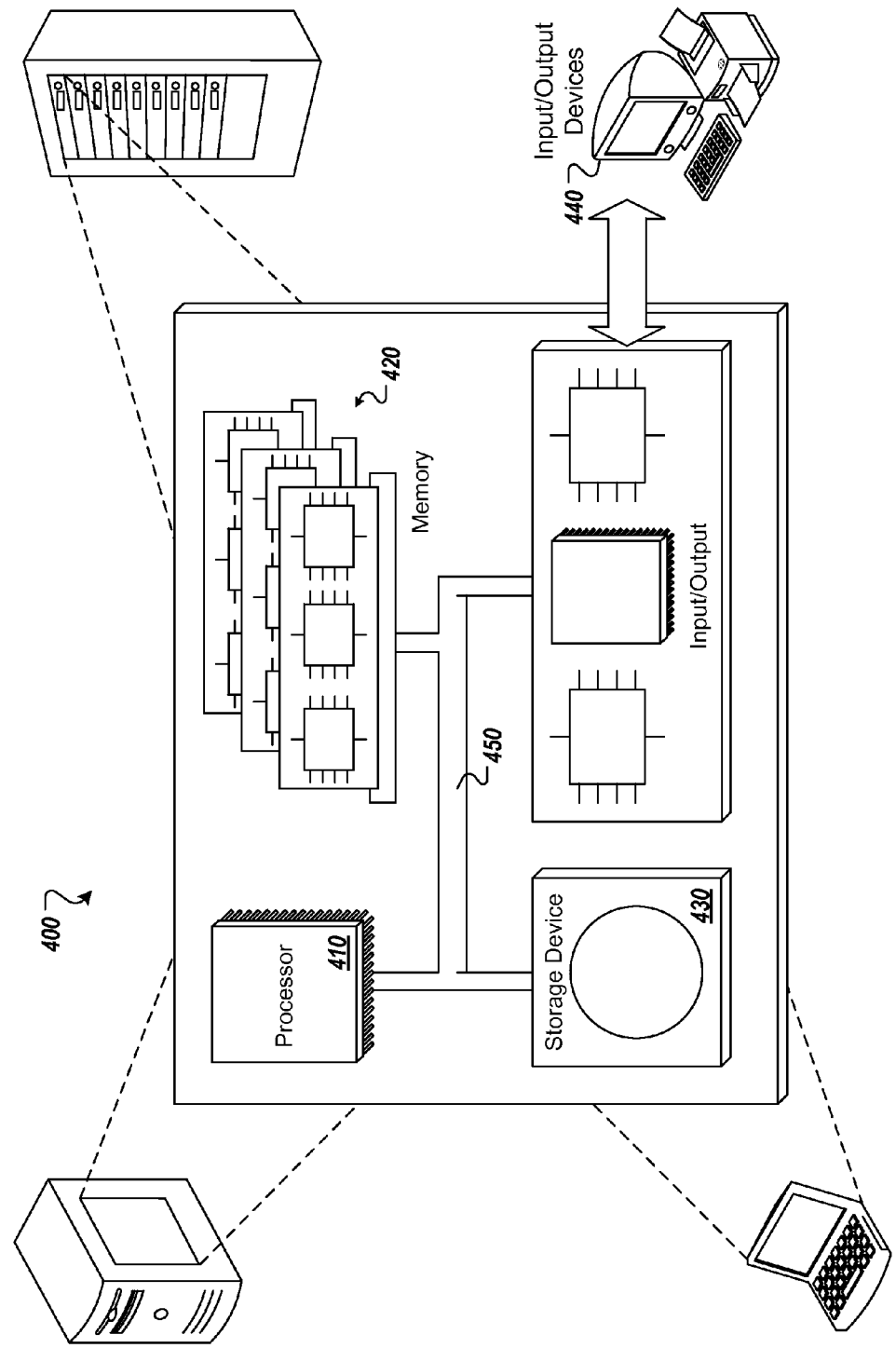
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for authenticating a user and user input to a back-end system and for validating the user input, the method being executed using one or more processors and comprising:

receiving, by the one or more processors, a unique user identifier and user input;

generating, by the one or more processors, a personalized image recognition challenge based on the unique user identifier and the user input, the personalized image recognition challenge comprising a plurality of images and a written message, the written message instructing a user to select a particular image of the plurality of images to validate the user input, wherein generating the personalized image recognition challenge comprises:

querying a database based on the unique user identifier to identify a plurality of personalized images associated with the unique user identifier, each personalized image being associated with a catchword, and selecting one or more personalized images from the plurality of personalized images, the one or more personalized images being included in the personalized image recognition challenge;

transmitting the personalized image recognition challenge for display on a device;

receiving, by the one or more processors, a response to the personalized image recognition challenge, the response comprising a selection of an image from the plurality of images; and authenticating the user and the user input based on the response.

2. The method of claim 1, wherein respective catchwords associated with the one or more personalized images are included in the written message.

3. The method of claim 1, wherein the one or more personalized images are randomly selected, and respective catchwords of the one or more personalized images are different from one another.

4. The method of claim 1, wherein generating the personalized image recognition challenge further comprises:

querying the database based on one or more catchwords and the unique user identifier to identify a plurality of non-personalized images, each non-personalized image being associated with a respective catchword of the one or more catchwords and not being associated with the unique user identifier; and selecting one or more non-personalized images from the plurality of non-personalized images, the one or more non-personalized images being included in the personalized image recognition challenge.

5. The method of claim 4, wherein the one or more catchwords comprise respective catchwords associated with one or more personalized images, the one or more personalized images being included in the personalized image recognition challenge.

6. The method of claim 1, wherein generating the personalized image recognition challenge comprises generating a fake input, the fake input being included in the personalized image recognition challenge.

7. The method of claim 6, wherein the fake input is not equal to the user input.

8. The method of claim 1, wherein generating the personalized image recognition challenge further comprises:

generating a watermark based on the user input; and watermarking images of the plurality of images based on the watermark, such that the watermark is human perceptible in the plurality of images.

9. The method of claim 8, wherein the watermark comprises the user input, a fake input and a timestamp.

10. The method of claim 8, wherein text within the watermark is provided as distorted and/or segmented text.

11. The method of claim 1, wherein text within the written message is provided as distorted and/or segmented text.

12. The method of claim 1, wherein authenticating the user and the user input based on the response comprises determining that the user has correctly selected a personalized image that has been associated with the user input.

13. The method of claim 1, wherein the written message further instructs the user to select another particular image of the plurality of images to select fake input.

14. A non-transitory computer-readable storage medium coupled to one or more processors and having instructions stored thereon which, when executed by the one or more processors, cause the one or more processors to perform operations for authenticating a user and user input to a back-end system and for validating the user input, the operations comprising:

receiving a unique user identifier and user input;

generating a personalized image recognition challenge based on the unique user identifier and the user input, the personalized image recognition challenge comprising a plurality of images and a written message, the written message instructing a user to select a particular image of the plurality of images to validate the user input wherein generating the personalized image recognition challenge comprises:

querying a database based on the unique user identifier to identify a plurality of personalized images associated with the unique user identifier, each personalized image being associated with a catchword, and selecting one or more personalized images from the plurality of personalized images, the one or more personalized images being included in the personalized image recognition challenge;

transmitting the personalized image recognition challenge for display on a device;

receiving a response to the personalized image recognition challenge, the response comprising a selection of an image from the plurality of images; and authenticating the user and the user input based on the response.

15. A system, comprising:

a computing device; and a computer-readable storage device coupled to the computing device and having instructions stored thereon which, when executed by the computing device, cause the computing device to perform operations for authenticating a user and user input to a back-end system and for validating the user input, the operations comprising:

receiving a unique user identifier and user input;

generating a personalized image recognition challenge based on the unique user identifier and the user input, the personalized image recognition challenge comprising a plurality of images and a written message, the written message instructing a user to select a particular image of the plurality of images to validate the user input, wherein generating the personalized image recognition challenge comprises:

querying a database based on the unique user identifier to identify a plurality of personalized images associated with the unique user identifier, each personalized image being associated with a catchword, and selecting one or more personalized images from the plurality of personalized images, the one or more personalized images being included in the personalized image recognition challenge;

transmitting the personalized image recognition challenge for display on a device;

receiving a response to the personalized image recognition challenge, the response comprising a selection of an image from the plurality of images; and authenticating the user and the user input based on the response.

\* \* \* \* \*